United States Patent [19]

Dodge

[11] 4,038,822
[45] Aug. 2, 1977

[54] FASTENER MEANS FOR CONNECTING A CYLINDRICAL BODY TO A HUB MEANS

[75] Inventor: Harley J. Dodge, South Bend, Ind.

[73] Assignee: The Bendix Corporation, South Bend, Ind.

[21] Appl. No.: 642,930

[22] Filed: Dec. 22, 1975

[51] Int. Cl.² .................................... B60T 13/20
[52] U.S. Cl. ...................... 60/554; 60/560; 91/369 A; 403/355; 92/98 D
[58] Field of Search .................... 92/98 D, 99, 64; 91/369 A, 376 R; 403/319, 326, 355, 377; 60/552, 553, 554, 560, 562, 579

[56] References Cited

U.S. PATENT DOCUMENTS

| | | | |
|---|---|---|---|
| 2,813,732 | 11/1957 | Hird | 403/377 |
| 2,947,557 | 8/1960 | Schwab | 403/377 |
| 2,980,455 | 4/1961 | Rosback | 403/326 |
| 3,057,332 | 10/1962 | Kellogg | 92/98 D |
| 3,289,547 | 12/1966 | Kytta | 92/99 |
| 3,688,647 | 9/1972 | Kytta | 91/369 A |
| 3,754,450 | 8/1973 | Putt | 91/369 A |
| 3,836,273 | 9/1974 | Gutman | 403/377 |
| 3,851,565 | 12/1974 | Camm | 92/99 |
| 3,906,836 | 9/1975 | Wilson | 92/99 |
| 3,972,191 | 8/1976 | Grabb | 60/553 |

FOREIGN PATENT DOCUMENTS 789,697   1/1958   United Kingdom ................ 403/319

*Primary Examiner*—Martin P. Schwadron
*Assistant Examiner*—Abraham Hershkovitz
*Attorney, Agent, or Firm*—Leo H. McCormick, Jr.; Ken C. Decker

[57] ABSTRACT

A fastener for joining a first force transmitter to an independent second force transmitter to assure continuity in movement therebetween. The first force transmitter has a hub with an axial bore therein. A first slot and a second slot, each of which has a recessed section on the bottom, are located on the housing surrounding the bore. The second force transmitter has a cylindrical body with an oval groove located adjacent the end thereof. First and second wishbone shaped clip members which surround the oval groove have first and second tabs located thereon. The cylindrical body is located in the axial bore of the hub means and the first and second tabs are positioned in the recesses of the slots. When the tabs are located in the recesses in the slots the cylindrical body is locked to the hub.

4 Claims, 4 Drawing Figures

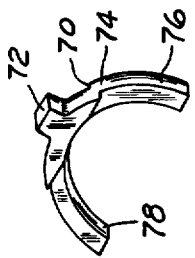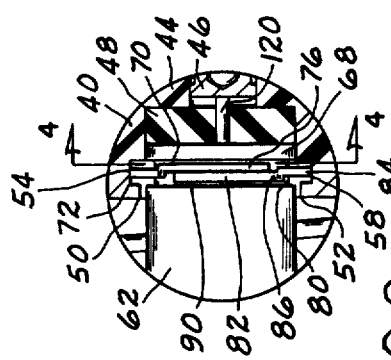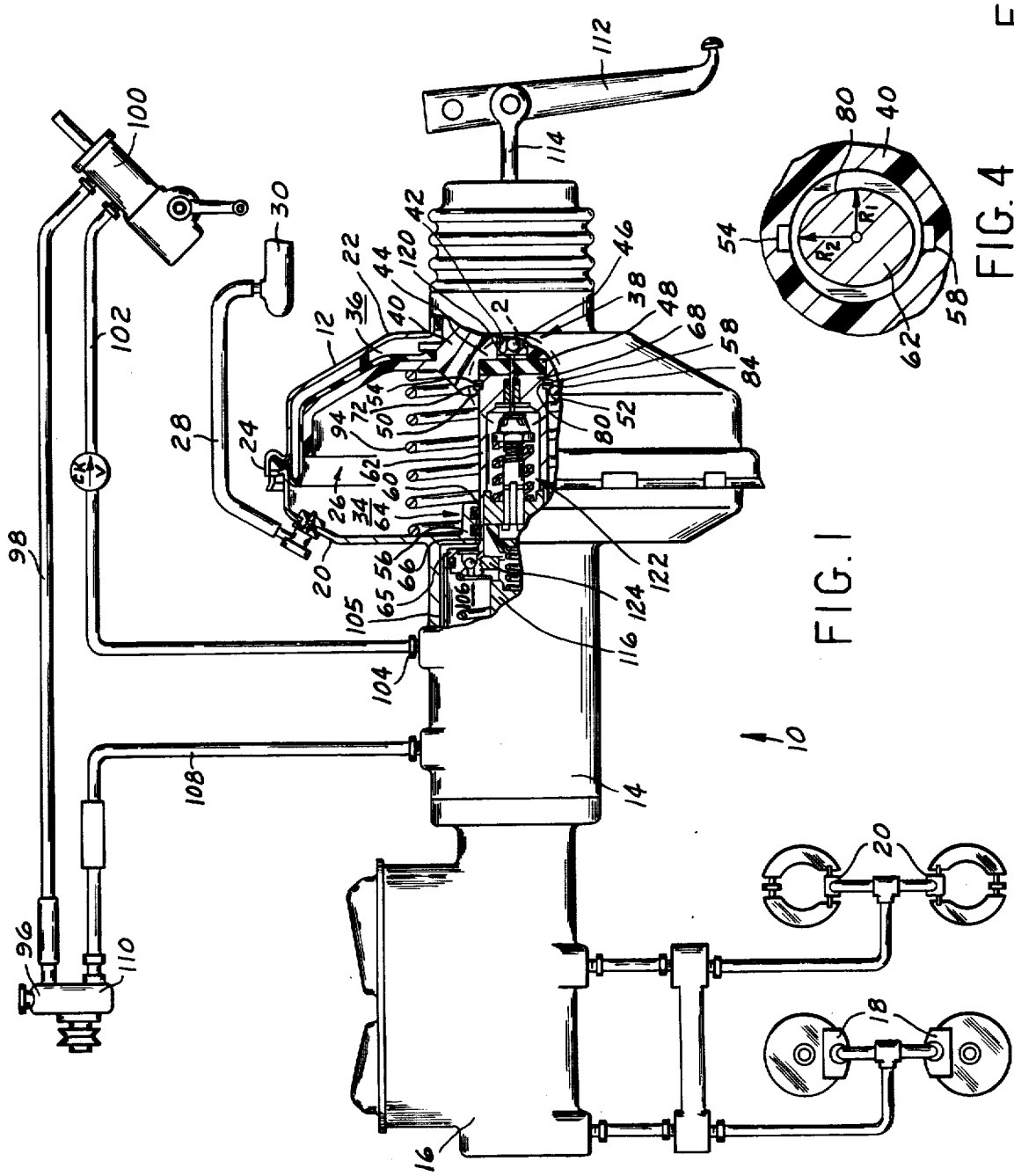

FASTENER MEANS FOR CONNECTING A CYLINDRICAL BODY TO A HUB MEANS

BACKGROUND OF THE INVENTION

In U.S. patent application Ser. No. 582,052, and now U.S. Pat. No. 3,967,536 incorporated herein by reference, a power braking system is disclosed whereby a pneumatically operated pressure differential servomotor is connected in series to a hydraulic servomotor to supply a master cylinder with an operational input force in response to an operator input. A cylindrical body in the hydraulic servomotor is pressed into a retainer in the hub of the movable wall of the pneumatically operated servomotor. During normal operation, the output of the pneumatic servomotor moves an output piston in the cylindrical body of hydraulic servomotor and when an additional output force is needed, a hydraulic valve is actuated to add the output of the hydraulic servomotor. Under some conditions, such as cold weather where the viscosity of the hydraulic fluid has been reduced or independent actuation of the hydraulic servomotor has occurred, a separation can occur between the cylindrical body and the hub. After such a separation, it is possible to lose hydraulic fluid through the actuation port of the hydraulic valve. It was suggested that the cylindrical body be fixed to the hub through a weld or screw thread arrangement. However, some relative movement is desired since the reactionary force from the master cylinder is carried through a disc without being modified by the hub.

Summary of the Invention

I have devised a means of fastening a cylindrical body associated with a power piston of a hydraulic servomotor with a hub of a pressure differentially moved wall of a pneumatic servomotor. An oval groove is placed on the end of the cylindrical body. First and second wishbone shaped clip means have tabs located thereon. The tabs are aligned in a place on the minor axis of the oval groove in the cylindrical body. The hub has a first slot and a second slot located on opposite sides of the interior of the axial bore. At the bottom of each of the first and second slots there is located a recess of a predetermined length. The cylindrical body and the tabs on the wishbone shaped clips are located in the axial bore and first and second slots, respectively. When the tabs are aligned with the recess in the slots, the cylindrical body is given a 90° twist causing the tabs to be moved into the recesses as the first and second wishbone shaped clip means follow contour of the oval groove. The ends of the wishbone shaped clip means are resiliently biased against the cylindrical body to prevent rotation of the cylindrical body while the tabs limit the linear movement of the cylindrical body with respect to the hub. Since the width of the recess at the bottom of each slot is about twice the width of the tabs, a gap occurs between the parts. The gap permits any reactionary force transmitted from the master cylinder to be transmitted into the reaction disc without being transferred through the wall, even through the cylindrical body and hub are tied together. However, independent movement of the cylindrical body and the hub is limited and the tabs retained in the recesses do not permit either the hydraulic servomotor or the pneumatic servomotor to move sufficiently to allow a separation therebetween.

It is therefore the object of this invention to provide a power brake apparatus having a pneumatic servomotor joined to a hydraulic servomotor with a fastener means to prevent a separation therebetween should either be moved independently.

It is another object of this invention to provide a fastener means for joining a cylindrical body to a hub means of a servomotor, the fastener means preventing the cylindrical body from rotating independently of the hub while allowing a predetermined amount of linear movement between the cylindrical body and the hub.

It is another object of this invention to provide a cylindrical body having an oval shaped groove on one end thereof. A wishbone shaped clip is located in the oval shaped groove and tabs on the wishbone shaped clip are aligned with notches in a hub to frictionally lock the cylindrical body to the hub and allow independent axial movement through a distance as determined by the length of the notches less the thickness of the tabs.

These and other objects will become apparent from reading this specification and viewing the drawing.

BRIEF DESCRIPTION OF THE DRAWINGS

FIG. 1 is a schematic illustration of a power brake system showing a sectional view of a linkage means for joining a pneumatic servo-motor to a hydraulic servomotor through a fastener means which prevents separation during independent movement of either.

FIG. 2 is an enlarged sectional view of the circumscribed portion of FIG. 1.

FIG. 3 is a perspective view of a wishbone clip means.

FIG. 4 is a sectional view through line 4—4 of FIG. 2 showing the relationship between hub means and the hydraulic plunger.

DETAILED DESCRIPTION OF THE PREFERRED EMBODIMENT

The power braking system 10 shown in FIG. 1 has a pneumatic power assist servomotor 12 and a hydraulic power assist servomotor 14 for actuating a master cylinder 16. The master cylinder 16 generates braking pressure to activate the front wheel brakes 18 and the rear wheel brakes 20.

The pneumatic power assist apparatus is of a type whose operation is disclosed in U.S. Pat. No. 3,289,547. In this type of servo-motor, a housing is formed by a front shell 20 and a rear shell 22 by a twist lock arrangement 24 to establish a closed cavity therein. A wall means 26 separates the cavity into a front chamber 34 and a rear chamber 36. The front shell 20 is connected by conduit 28 to the vehicle engine intake manifold 30. Vacuum, which is produced at the intake manifold 30 evacuates air from the chambers 34 and 36 through the valve means 38.

The wall means 26 has a hub means 40 which has an axial bore 42 located therein for retention of a valve means (not shown). The axial bore 42 extends through the hub means 40 and terminates at shoulder 44 which limits the movement of the valve plunger 46. A reaction disc 48 is located adjacent the shoulder 44.

The hub means 40 has a first slot 50 and a second slot 52 located 180° apart in the axial bore 42. Recesses or notches 54 and 58 are located adjacent the reaction disc 48 at the bottom of each slot 50 and 52, respectively.

The operation and structure of hydraulic power assist servomotor 14 is completely described in U.S. pat. application Ser. No. 582,052, and now U.S. Pat. No. 3,967,536 incorporated herein by reference, and only those portions which have been changed through this invention are described in detail. The housing 56 of the hydraulic power assist servomotor 14 has an annular opening 60 which provides a bearing and guide surface for the cylindrical body 62 which links or connects the hub means 40 to the power piston means 65.

The cylindrical body 62 has a first end 64 which is fixed to the power piston means 65 by a threaded connection 66 and a second end 68 which abuts the reaction disc 48. An oval groove 80 is placed on the peripheral surface of the cylindrical body 62 adjacent the second end 68. The groove 80, as best seen in FIG. 2, has an oval peripheral surface with a minor radical axis with a radius $R_1$ and a major radial axis with a radius $R_2$ as seen in FIG. 4.

A first wishbone shaped clip or yoke member 70 is placed in groove 80. The first wishbone shaped clip or yoke member 70 has a tab 72 which is offset from the main body 74. The main body 74 has a first leg 76 and a second leg 78 which extend past the axial center of the cylindrical body 62 to substantially surround the groove 80.

A second wishbone shaped clip or yoke member 82 is placed in the oval groove 80 adjacent the first wishbone shaped clip 70. The second wishbone shaped clip or yoke member 82 has a tab 84 which is offset from the main body 86 in a manner such that tabs 72 and 84 are in the same radial plane with respect to the cylindrical body 62.

During assembly, tabs 72 and 84 of the first and second wishbone shaped clips or yoke members are located on the cylindrical body 62, 180° apart in a plane along the minor radial axis of the oval peripheral surface of groove 80. The cylindrical body 62 is aligned with the axial bore 42; the first tab 72 is located in the first slot 50, and the second tab 84 is located in the second slot 52. The cylindrical body 62 is moved toward the reaction disc 48 until tabs 72 and 84 are aligned with the first recess or notch 54 and the second notch or recess 58, respectively. The jub means 40 is held stationary and the cylindrical body 62 is rotated 90° at which time the first tab 72 and the second tab 84 are moved to a plane on the major radial axis of the cylindrical body adjacent the peripheral surface of the oval groove 80. As the wishbone shaped clips 70 and 82 move on the oval surface, the first tab 72 moves into the first recess 54 and the second tab 84 moves into the recess 58. At the same time, legs 76 and 78 of the first clip 70 and the legs 90 (only one being shown) of clip 84 is biased toward the cylindrical body 62 to prevent rotational movement with respect to the hub means 40. However, the cylindrical body 62 and the hub means 40 can linearly move relative to each other since the recesses or notches 54 and 58 are about twice as wide as tabs 72 and 84.

Mode of Operation of the Preferred Embodiment

When an operator starts a vehicle equipped with the braking system as illustrated in FIG. 1, vacuum which is created at the intake manifold 42 evacuates air from the pneumatic power assist apparatus 12 by flowing air from the rear chamber 34 through the axial bore 42, past the actuation valve means 38 out passages and into the front chamber 30. With the air evacuated from the front chamber 30 and the rear chamber 36, the return spring 94 can hold wall means 26 against the rear shell 22.

At the same time pump 96, which is driven by a belt attached to the output shaft of the engine, communicates hydraulic fluid through conduit 98 for operating the open center power steering gear 100. Since power steering gear 100 is of the open center type, hydraulic fluid continually flows through conduit 102 into inlet chamber 104 of the hydraulic power assist servomotor and into the outlet chamber 106. From the outlet chamber 106, this hydraulic fluid flows through conduit 108 to the reservoir 110 of the pump 96.

When the vehicle operator desires to stop the vehicle, an input force is applied to pedal 112 which moves the actuation push rod 114 and operates the control valve means 38 in the pneumatic power assist apparatus 12. When the control valve 38 is actuated, air from the atmosphere enters the rear chamber 36 to create a pneumatic pressure differential across the wall means 26. The pneumatic pressure differential provides a force which acts through the reaction disc 48 to move the push rod 116 through the cylindrical body 62 of the piston means 64. Plunger 44, which is attached to this control valve means 38, simultaneously actuates pin 120 with an input force which causes valve means 122 to move toward seat 124 and restrict flow of hydraulic fluid from the inlet chamber 105 into the outlet chamber 106. The restriction of flow of the hydraulic fluid through the valve means 112 creates hydraulic pressure differential across piston means 64. This hydraulic pressure differential provides a force which acts on the piston means 64 and moves the push rod 116 to activate the master cylinder 16.

The hydraulic output force produced in the master cylinder 16 is carried through push rod 116 directly to the cylindrical body 62. The cylindrical body 62 acts on the reaction disc 48. Since tabs 72 and 84 do not completely fill the recesses or notches 54 and 58, any reaction force is directly transmitted into the reaction disc 48 to provide the operator with an indication of the output force being produced in the master cylinder 16.

When the input force to pedal 112 is removed, valve means 38 terminates the communication of air to the rear chamber 36 to allow the wall means 26 to be vacuum suspended. If the wall means 26 returns to the rest position against wall 22 at a different rate than piston means 64, tabs 72 and 84 engages the housing of the hub means 40 and prevent separation of the hub means 40 and the cylindrical body 62. Any noise created through the independent movement of the cylindrical body 62 and the hub means 40 is absorbed in the reaction disc means 48.

I claim:

1. In a power brake apparatus having a wall means moved by a pneumatic pressure force and a piston means jointly moved by a hydraulic pressure force and said wall means to develop an output force, fastener means for connecting the piston means to the wall means; and fastener means comprising:

cylindrical means having a first end secured to said piston means and a second end, said cylindrical means having an oval groove on the outer peripheral surface thereof and located adjacent the second end;

hub means connected to said wall means, said hub means having an axial bore therein with a first slot and a second slot extending along the axial bore for a predetermined distance, said first slot having a first recess on the end thereof, said second slot having a second recess on the end thereof; and connecting means including a first clip means mounted in said oval groove of the cylindrical means and having a first tab located in said first recess and a second clip means mounted in said oval groove of the cylindrical means and having a second tab located in said second recess for connecting the cylindrical means to the hub means while allowing said cylindrical means a predetermined amount of linear movement with respect to said hub means to permit a reactionary force applied to the wall means from the piston means to be freely transmitted therethrough to resist an operator input force.

2. In the power brake apparatus, as recited in claim 1, wherein said first clip means includes
a first yoke member having first legs which substantially surround the oval groove, said first tab being offset from the first legs; and
the second clip means includes a second yoke member having second legs which substantially surround the oval groove, sais second tab being offset from said second legs such that the first tab and the second tab are located in a plane perpendicular to the cylindrical means.

3. In the power brake apparatus, as recited in claim 1, wherein said fastener means further includes:
reactionary disc means located adjacent said second end of the cylindrical means for absorbing any noise which may result between the independent movement of the cylindrical means and the hub means.

4. A method of connecting a wall moved by pneumatic differential pressure force to a piston jointly moved by a hydraulic force and the wall comprising the step of:

placing an oval peripheral groove on one end of a cylindrical linkage member to create a major radial axis and a minor radial axis;
attaching the other end of the cylindrical linkage member to said piston;
placing a first yoke member on said oval peripheral groove;
placing a second yoke member on said oval peripheral groove;
aligning a first tab on the first yoke member and a second tab on the second yoke member in a plane with the minor radial axis on the oval peripheral groove in the cylindrical linkage member;
aligning said first tab and said second tab with a corresponding first slot and a second slot in an axial bore in said wall;
moving said cylindrical linkage member in said axial bore until said first tab and said second tab on the first and second yoke members are aligned with a first radial recess and a second radial recess adjacent to said axial bore in said wall; and
rotating said cylindrical linkage member while holding said wall stationary causing said first yoke member and said second yoke member to move on said oval peripheral groove from the minor radial axis to the major radial axis and to position said first tab and second tab in the first recess and the second recess, respectively, and thereby establish a connection therebetween which allows limited linear motion while preventing a complete separation.

* * * * *